June 24, 1930. F. D. STANLEY 1,765,629
STUFFING BOX
Filed Sept. 17, 1923

INVENTOR
FRED D. STANLEY
BY
ATTORNEY

Patented June 24, 1930

1,765,629

UNITED STATES PATENT OFFICE

FRED D. STANLEY, OF THREE RIVERS, MICHIGAN, ASSIGNOR TO FAIRBANKS, MORSE & CO., A CORPORATION OF ILLINOIS

STUFFING BOX

Application filed September 17, 1923. Serial No. 663,194.

My invention relates to improvements in stuffing boxes; and its object is to combine with the ordinary stuffing box an auxiliary rod-wiping stuffing box, the two to be assembled together, thus making for ease of manufacture and simplicity of adjustment and repair.

I have found that in employing ordinary stuffing boxes, for example in pumps, there is a tendency for the stuffing box to leak, a certain amount of moisture tending to follow the piston rod back into the cross head housing. The moisture will mix with the oil in the cross head housing, causing corrosion of the working parts and soon renders the oil useless. I provide another packing which, for convenience, may be deemed a secondary rod wiping packing, and in my invention I combine the stuffing box for this packing with the main stuffing box in the pump cylinder head. It is evident that this arrangement will make for ease of assembly and adjustment, is simple of manufacture and neat in appearance.

Though my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

Figure 1:
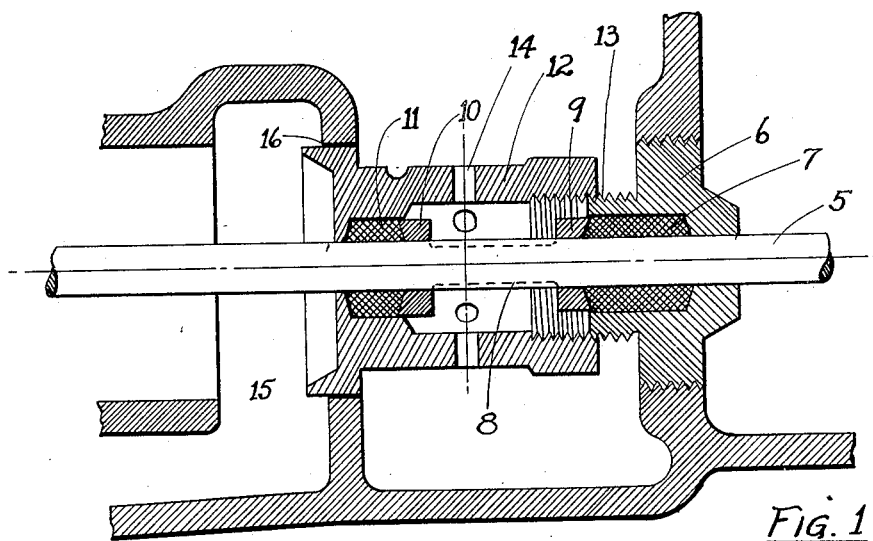
Figure 2:
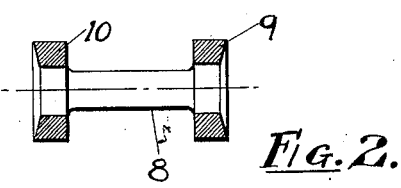

In the drawings, Fig. 1 is a sectional elevation of a construction in which the secondary stuffing box is carried in the gland nut and a double gland is used. Fig. 2 is a sectional view of a double gland which may be used in the construction shown in Fig. 1.

In Fig. 1 the piston rod is indicated at 5, passing through the stuffing box, 6, containing the rings of packing, 7. The gland, 8, is preferably made in one piece but is preferably a double construction having the two heads, 9 and 10, at either end. The construction of this gland may be clearly seen in Fig. 2. There may be openings in its side to permit inspection or the release of water that is gathered from the rod by the secondary stuffing box packed with rings, 11. The secondary stuffing box for the packing, 11, is a cavity in the gland nut, 12, which is preferably threaded onto the main stuffing box at 13. By this arrangement, when the nut, 12, is screwed up on the threads, 13, both the primary stuffing box packing, 7, and the secondary stuffing box packing, 11, will be tightened up and by the same amount of pressure. Nut, 12, is made with a cavity to receive the water wiped from the piston rod and having holes 14, through which this water will pass out without entering the cross-head chamber of the pump, 15. Nut 12 is also made to fit loosely into the opening in the cross-head cavity, 15, this joint being indicated at 16. This nut, therefore, takes the place of the ordinary immovable closure for the cross-head cavity. A convenient feature of this arrangement is that when nut 12, is completely unscrewed from the threads of the stuffing box, 6, it can be slid back on the rod into the cross-head chamber, 15, thereby reserving ample room for changing both packings.

I claim:

1. In a stuffing box, the combination with a threaded member, of means for removably positioning said member in a stationary portion of a machine, a threaded second member cooperating when united with said first member to produce a structure adapted to accommodate a piston rod and packing glands, and comprising a creepage chamber thereabout, and drain openings from the chamber, a primary packing disposed substantially within the first member, a secondary packing disposed substantially within the second member, a double gland intermediate said packings, said double gland comprising a unitary structure embodying a head adapted to compress the primary packing and a head adapted to compress the secondary packing said heads being joined by spacing means provided with creepage drain openings, and adapted when the members are united to produce uniform pressure on both packings.

2. In a double stuffing box structure, in combination, a threaded boss, means, comprised by said boss and a stationary portion of a machine, for removably positioning said boss, a gland nut adapted to be united with said boss to produce a structure adapted to accommodate a pair of packing glands, a piston rod operatively disposed in said structure, a creepage chamber formed about the piston rod and packing glands, said chamber being provided with drain openings, a primary packing disposed substantially within said boss, a secondary packing disposed substantially within the nut, a double gland intermediate said packings, said double gland comprising a structure consisting of a pair of heads and an intermediate portion fixedly spacing said heads, said intermediate portion of the gland being provided with creepage drain openings into said chamber, the intermediate portion being adapted, in assembly with said heads and nut, to provide a uniform pressure on the packings in both ends of said stuffing box, and to fix the dimensions of said creepage chamber.

FRED D. STANLEY.